(12) United States Patent
Uehlinger

(10) Patent No.: US 11,754,492 B2
(45) Date of Patent: Sep. 12, 2023

(54) PHOTOACOUSTIC GAS SENSOR DEVICE

(71) Applicant: Sensirion AG, Stäfa (CH)

(72) Inventor: Thomas Uehlinger, Stäfa (CH)

(73) Assignee: Sensirion AG, Stäfa (CH)

(*) Notice: Subject to any disclaimer, the term of this patent is extended or adjusted under 35 U.S.C. 154(b) by 191 days.

(21) Appl. No.: 17/603,365

(22) PCT Filed: Apr. 16, 2020

(86) PCT No.: PCT/EP2020/060697
§ 371 (c)(1),
(2) Date: Oct. 13, 2021

(87) PCT Pub. No.: WO2020/212481
PCT Pub. Date: Oct. 22, 2020

(65) Prior Publication Data
US 2022/0187193 A1    Jun. 16, 2022

(30) Foreign Application Priority Data

Apr. 17, 2019  (EP) .................................. 19169966

(51) Int. Cl.
*G01N 21/17* (2006.01)
*G01N 21/3504* (2014.01)
*G01N 29/24* (2006.01)

(52) U.S. Cl.
CPC ..... *G01N 21/1702* (2013.01); *G01N 21/3504* (2013.01); *G01N 29/2418* (2013.01); *G01N 2021/1704* (2013.01)

(58) Field of Classification Search
CPC ........... G01N 21/1702; G01N 21/3504; G01N 29/2418; G01N 2021/1704; G01N 2021/1706; G01N 2021/1708
See application file for complete search history.

(56) References Cited

U.S. PATENT DOCUMENTS

| | | |
|---|---|---|
| 4,740,086 A | 4/1988 | Oehler et al. |
| 4,818,882 A | 4/1989 | Nexo et al. |

(Continued)

FOREIGN PATENT DOCUMENTS

| | | |
|---|---|---|
| DE | 19516938 C1 | 12/1996 |
| DE | 10303263 A1 | 8/2004 |

(Continued)

OTHER PUBLICATIONS

International Search Report and Written Opinion for corresponding International Patent Application No. PCT/EP2020/060697 dated Jun. 23, 2020.

(Continued)

*Primary Examiner* — Suman K Nath
(74) *Attorney, Agent, or Firm* — Renner, Otto, Boisselle & Sklar, LLP

(57) ABSTRACT

A photoacoustic gas sensor device is proposed for determining a value indicative of a presence or a concentration of a component in a gas. The photoacoustic gas sensor device comprises a substrate, and a measurement cell body arranged on a first side of the substrate. The substrate and the measurement cell body define a measurement cell enclosing a measurement volume. The measurement cell comprises an aperture for a gas to enter the measurement volume. The device further comprises an electromagnetic radiation source for emitting electromagnetic radiation, and a microphone for measuring a sound wave generated by the component in response to an absorption of electromagnetic radiation by the component. The electromagnetic radiation source and the microphone are arranged on the first side of the substrate and in the measurement volume. The microphone has a bottom port facing the substrate, and the measurement volume is communicatively coupled to the bottom port.

20 Claims, 2 Drawing Sheets

(56) References Cited

U.S. PATENT DOCUMENTS

| | | | |
|---|---|---|---|
| 5,753,797 A | 5/1998 | Forster et al. | |
| 6,006,585 A | 12/1999 | Forster | |
| 7,106,445 B2 | 9/2006 | Uber | |
| 8,351,634 B2 | 1/2013 | Khenkin | |
| 8,584,508 B2 | 11/2013 | Rezachek | |
| 8,689,607 B2 | 4/2014 | Rezachek et al. | |
| 8,695,402 B2 † | 4/2014 | Thorson | |
| 9,410,931 B1 | 8/2016 | Okandan et al. | |
| 9,513,261 B2 | 12/2016 | Dehe et al. | |
| 9,949,051 B2 † | 4/2018 | Higgins | |
| 10,241,088 B2 | 3/2019 | Theuss et al. | |
| 10,302,554 B2 | 5/2019 | Tumpold et al. | |
| 2009/0001553 A1* | 1/2009 | Pahl | B81B 7/0064 438/126 |
| 2009/0180655 A1* | 7/2009 | Tien | H04R 1/086 381/361 |
| 2010/0128914 A1 | 5/2010 | Khenkin | |
| 2011/0296900 A1 | 12/2011 | Thorson | |
| 2012/0055232 A1 † | 3/2012 | Thorson | |
| 2012/0237073 A1 | 9/2012 | Goida et al. | |
| 2013/0239658 A1 | 9/2013 | Lust | |
| 2014/0117473 A1 | 5/2014 | Kierse et al. | |
| 2015/0101395 A1 | 4/2015 | Dehe et al. | |
| 2015/0350792 A1 | 12/2015 | Grosh et al. | |
| 2016/0043664 A1 | 2/2016 | Theuss et al. | |
| 2016/0277844 A1 | 9/2016 | Kopetz et al. | |
| 2016/0282259 A1* | 9/2016 | Kolb | G01N 29/30 |
| 2016/0313288 A1 | 10/2016 | Theuss et al. | |
| 2016/0313291 A1 | 10/2016 | Johansen et al. | |
| 2017/0067859 A1 | 3/2017 | Kolb et al. | |
| 2017/0288125 A1 | 10/2017 | Glacer | |
| 2017/0290097 A1 | 10/2017 | Pindi et al. | |
| 2017/0290098 A1 | 10/2017 | Kautzsch et al. | |
| 2017/0325012 A1 | 11/2017 | Dehe et al. | |
| 2017/0325013 A1 | 11/2017 | Dehe et al. | |
| 2017/0350810 A1* | 12/2017 | Tumpold | G01N 21/1702 |
| 2017/0350868 A1 | 12/2017 | Tumpold et al. | |
| 2017/0374442 A1 † | 12/2017 | Pennock | |
| 2018/0059066 A1 | 3/2018 | Glacer et al. | |
| 2018/0070162 A1 | 3/2018 | Lim et al. | |
| 2018/0120266 A1 | 5/2018 | Tumpold et al. | |
| 2018/0164215 A1 | 6/2018 | Glacer et al. | |
| 2018/0188213 A1 | 7/2018 | Tumpold et al. | |
| 2019/0017893 A1 | 1/2019 | Tumpold | |
| 2019/0356974 A1* | 11/2019 | Loeppert | H04R 19/04 |

FOREIGN PATENT DOCUMENTS

| | | |
|---|---|---|
| DE | 102014114672 A1 | 4/2015 |
| EP | 1211501 A1 | 6/2002 |
| EP | 0760474 A | 5/2004 |
| EP | 1574841 A1 | 9/2005 |
| EP | 2392916 A | 12/2011 |
| EP | 3101914 A1 | 12/2016 |
| EP | 3483589 A1 | 5/2019 |
| EP | 3693725 A1 | 8/2020 |
| EP | 3715842 A1 | 9/2020 |
| WO | 1998012522 A1 | 3/1998 |
| WO | 1998029733 A1 | 7/1998 |
| WO | 2006116017 A2 | 11/2006 |
| WO | 2012033756 A1 | 3/2012 |
| WO | 2016102925 A1 | 6/2016 |
| WO | 2018022773 A1 | 2/2018 |

OTHER PUBLICATIONS

Huber et al., A selective, miniaturized, low-cost detection element for a photoacoustic $CO_2$ sensor for room climate monitoring, Article, ScienceDirect, Procedia Engineering 87 (2014) 1168-1171, EUROSENSORS 2014, the XXVIII edition of the conference series.

IM69d130, High performance digital XENSIV™ MEMS microphone, Catalog, Dec. 19, 2017, Infineon Technologies AG.

Lewi, et al., Thermal tuning capabilities of semiconductor metasurface resonators, Journal, Oct. 21, 2018.

Weber, et al., Resonant Photoacoustic Detection of $NO_2$ with an LED Based Sensor, Article, © 2018 by the authors; Licensee MDPI, Basel, Switzerland.

\* cited by examiner

† cited by third party

PHOTOACOUSTIC GAS SENSOR DEVICE

CROSS REFERENCES TO RELATED APPLICATIONS

This application is a national phase of International Application No. PCT/EP2020/060697 filed 16 Apr. 2020, which claims priority to European Patent Application No. 19169966.9 filed 17 Apr. 2019, the entire disclosures of which are hereby incorporated by reference.

TECHNICAL FIELD

The present invention relates to a photoacoustic gas sensor device which is configured to determine a value indicative of a presence or a concentration of a component, in particular of $CO_2$, in a gas.

BACKGROUND ART

Photoacoustic gas sensors rely on the physical effect that e.g. infrared radiation is absorbed by molecules of a component of interest in a gas, e.g. $CO_2$, thereby transferring the molecules to an excited state. Subsequently heat is generated due to non-radiative decay of the excited state, e.g. by collisions of the molecules, which leads to an increase of pressure. Through modulating the infrared radiation to be absorbed with a modulation frequency, the pressure varies at the modulation frequency. Such pressure variation may be measured by a pressure transducer. The concentration of the component is proportional to an amplitude of the pressure variation.

Conventional photoacoustic gas sensors are large in size due to a long optical path length required for sufficient absorption of infrared radiation by molecules of the component. Moreover conventional photoacoustic gas sensors require a complex three-dimensional assembly of measurement cell, infrared source and pressure transducer.

It is hence an object of the present invention to provide a photoacoustic gas sensor device which is small in size, simple to assemble, and at the same time provides accurate values indicative of a presence or a concentration of the component in the gas.

DISCLOSURE OF THE INVENTION

The object is achieved by a photoacoustic gas sensor device according to the present invention as follows. The photoacoustic gas sensor device, for determining a value indicative of a presence or a concentration of a component in a gas, comprises a substrate and a measurement cell body arranged on a first side of the substrate. The substrate and the measurement cell body define a measurement cell enclosing a measurement volume. The measurement cell comprises an aperture for a gas entering the measurement cell. In one embodiment, the aperture allows a gas exchange between the measurement volume and surroundings of the measurement cell. The device further comprises an electromagnetic radiation source for emitting electromagnetic radiation, and a microphone for measuring a sound wave generated by the component in response to an absorption of electromagnetic radiation by the component. The electromagnetic radiation source and the microphone are arranged on the first side of the substrate and in the measurement volume. The microphone has a bottom port facing the substrate, and the measurement volume is communicatively coupled to the bottom port.

In a preferred embodiment, the electromagnetic radiation used is infrared radiation. This means that the electromagnetic radiation source is an infrared radiation source for emitting infrared radiation. Infrared radiation preferably is defined as radiation having a wavelength in a range between 700 nm and 1 mm. In this embodiment, the microphone is configured to measure the sound wave generated by the component in response to the absorption of the infrared radiation by the component. In another embodiment, the electromagnetic radiation source is a source for emitting radiation of a wavelength in a range between 100 nm and 700 nm.

The electromagnetic radiation source may in one embodiment be a heater, in another embodiment be a laser, in a further embodiment be an LED. The heater may also be considered as a broadband radiation source, while the laser and the LED may be considered a narrow band radiation source.

The photoacoustic gas sensor device relies on the photoacoustic effect: Molecules of a gas component of interest, e.g. $CO_2$, absorb electromagnetic radiation, in this example infrared radiation, leading to a generation of heat due to non-radiative decay, e.g. by collisions between the molecules of the gas component of and/or by collisions of the molecules of the gas component with different molecules, which in turn leads to an increase of pressure. By modulating an intensity of the electromagnetic radiation with a modulation frequency, a modulation of pressure may be achieved. Such pressure modulation or pressure variations, i.e. sound waves, may be measured by a pressure transducer, i.e. a microphone. The value indicative of a presence or a concentration of the component, i.e. the component's concentration, may then be determined dependent on the pressure variations, in particular dependent on an amplitude of the pressure variations, since the amplitude may be assumed to be proportional to an amount of electromagnetic radiation absorbed by the component, and hence proportional to the component's concentration in the gas if all other factors, e.g. a mean optical path length in the measurement volume, stay equal.

Hence it is preferred that a large fraction of the electromagnetic radiation emitted by the electromagnetic radiation source is actually absorbed by the component, and preferably selectively absorbed only by the component of interest, and neither by other components of the gas nor by components of the device. Moreover it is preferred that the pressure transducer, i.e. the microphone, measures the pressure variations, i.e. sound waves, at the modulation frequency caused by the photoacoustic effect in the component of interest, but not other sounds, e.g. sounds from the surroundings. These advantages are achieved by the above described gas sensor device.

Preferably, the electromagnetic radiation emitted by the electromagnetic source is only emitted in a band matching an absorption peak of the gas component of interest. A band is considered a subrange of the electromagnetic spectrum, preferably symmetrically around the absorption peak, with a max/min band limit of +/−15% of the absorption peak value. Preferably, the electromagnetic radiation emitted by the electromagnetic source comprises or is infrared radiation. A band of infrared radiation is advantageously chosen to match an absorption peak of the gas component of interest. In an embodiment, the photoacoustic gas sensor device is used as a $CO_2$ sensor. In that case the band of infrared radiation is centered around a wavelength of 4.3 µm. Preferably the band has a full width at half maximum of below 0.5 µm, which may be understood as a narrow band.

In an embodiment, the substrate is a printed circuit board (PCB), e.g. made from FR4, or a ceramic material which provides more mechanical stability. At least the microphone, the electromagnetic radiation source, and preferably the measurement cell body are mounted on a common side of the substrate, i.e. the first side. Preferably all electronic components are mounted on the first side of the substrate. At least the microphone, the electromagnetic radiation source, and preferably the measurement cell body are surface mounted on the first side of the substrate. Preferably all electronic components are surface mounted on the first side of the substrate such that the photoacoustic gas sensor device is an SMD (surface mounted device). Preferably, a second side of the substrate, i.e. opposite the first side, only includes contacts for electrically connecting the photoacoustic gas sensor device to a carrier. In an embodiment, the contacts include land grid array (LGA) pads arranged for SMD assembly and/or reflow soldering. This facilitates an assembly of the device with other components by the customer. Other choices of contacts may include DFN, QFN or castellated holes.

In an embodiment, the measurement cell body is made from sheet metal, e.g. by deep drawing. Sheet metal has the advantages of being mechanically stable even at low thickness, and of showing a high reflectivity for electromagnetic radiation even without any further coating. Nevertheless the measurement cell body may in a different embodiment be made from plastic, e.g. by injection molding. Preferably the measurement cell body and the substrate are connected in a gas-tight manner, e.g. by gluing or soldering. Advantageously the measurement cell is acoustically tight.

Advantageously an inner surface of the measurement cell has a reflectivity of more than 70%, preferably in the band, preferably more than 80%, and more preferably more than 90%. In an embodiment, the inner surface of the measurement cell body and/or a part of the substrate is coated with a reflective coating having a reflectivity of more than 70%, preferably in the band, preferably more than 80%, more preferably more than 90%. Such coating by be made from a metal, e.g. from one of gold, aluminum, nickel, copper. Gold is particularly convenient for plating the substrate, e.g. the PCB, since it is anyways applied as a corrosion protection to a surface of conductors during forming of the PCB.

In an embodiment, a ratio of inner surfaces of the measurement cell with a reflectivity of above 70% to inner surfaces of the measurement cell with a reflectivity of below 70% is above 20, preferably above 50, and more preferably above 100. Preferably a top side of the microphone facing the measurement volume is made of a reflective material or is coated with the reflective coating. Such coating of the microphone is facilitated by the use of a bottom port microphone. Preferably also part of the electromagnetic radiation source is coated with the reflective coating or is made from a reflective material. Thus a high ratio of highly reflective surfaces as defined above is achieved.

All these measures contribute to a longer mean optical path length of the electromagnetic radiation within the measurement volume. In this way, the mean optical path length within the measurement volume may be increased to >1 cm, preferably >3 cm, more preferably >5 cm. This in turn facilitates the measurement cell to be small, in particular smaller than conventional photoacoustic gas sensors having a linear optical path length.

In an embodiment, dimensions of the measurement cell are smaller than 2×2×2 cm$^3$, preferably smaller than 1×1×1 cm$^3$. The entire photoacoustic gas sensor device may have a size of e.g. 1×1×0.7 cm$^3$. Despite the small size of the measurement cell, the mean optical path length is comparable, or even larger, than in many conventional photoacoustic gas detectors, and/or in conventional NDIR sensors.

Furthermore, a high reflectivity of the inner surfaces of the measurement cell reduces an offset of the pressure signal, which is generated by the photoacoustic effect occurring in solid matter, e.g. on the surface of the measurement cell body.

Further advantages of the present invention comprise: The device is less prone to mechanical instabilities than conventional gas sensors, and may be built very stable. The value of the concentration of the component of interest are offset-free due to the underlying measurement principle of the photoacoustic effect, so only one device is needed for accurate measurements.

In an embodiment, a gas permeable membrane covers the aperture. The membrane is permeable for a gas exchange between the measurement volume and surroundings of the measurement cell. The gas permeable membrane may in particular be made of one or more of the following materials: sintered metal, ceramic, polymer. The membrane advantageously also acts as a decoupling element between the measurement volume and the surroundings of the measurement cell. Thus it preferably damps a movement of gas molecules through the membrane such that pressure variations, e.g. sound waves, from the surroundings are damped when propagating into the measurement volume, and pressure variations inside the measurement volume are largely kept inside.

In different embodiments, the electromagnetic radiation source is one of the following: a broadband source covered by a wavelength-selective bandpass filter filtering out electromagnetic radiation outside the band, or a narrowband source comprising a meta-surface resonator, including an LED for example. The broadband source is defined as emitting radiation of a wide spectrum, such as across the entire infrared spectrum or e.g. between 0.8 μm and 10 μm. Such broadband source may be a conventional infrared emitter with a heater. The broadband source is preferably covered by a bandpass filter, e.g. a dielectric filter, or a meta-material filter, or a CMOS absorption layer, such that only infrared radiation of the band is emitted into the measurement volume.

In different embodiments, the microphone may either be a general pressure transducer as described above, or a microphone, in particular sensitive to only a certain range of frequencies around the modulation frequency. The microphone is a bottom port microphone, which would conventionally be applied in an arrangement facing a hole in a substrate. According to the present invention, however, the bottom port microphone is directly facing the substrate, not any hole in the substrate. On the one hand, this requires an opening, e.g. a lateral opening, between the microphone and the substrate such that the measurement volume and the bottom port of the microphone are communicatively coupled. This preferably includes that pressure changes in the measurement volume are detectable in the bottom port of the microphone and thus can be detected by the microphone. The opening is detailed later. On the other hand, the use of a bottom port microphone facilitates a coating of the top surface of the microphone or the usage of a reflecting package of the microphone, e.g. made out of metal, contributing to a better reflecting coverage in order to increase a mean optical path length within the measurement volume as described above.

In an embodiment, the device further comprises a controller, e.g. an ASIC, configured to control the electromagnetic radiation source. The controller may be arranged on or integrated in the substrate. The controller is configured to control an intensity of the electromagnetic radiation to modulate with the modulation frequency. The modulation frequency is between 1 Hz and 100 kHz, preferably between 10 Hz and 200 Hz, more preferably between 20 Hz and 60 Hz, e.g. 40 Hz, and in particular a heater, if applicable, of the electromagnetic radiation source is switched with the modulation frequency.

Low modulation frequencies of <100 Hz are advantageous for generating large photoacoustic signals. Also, it is known that bottom port microphones show a better response to low frequencies than top port microphones, since bottom port microphones have a larger backside volume, meaning less damping of a membrane of the microphone. Moreover bottom port microphones generally have a good signal-to-noise ratio.

Preferably the controller is further configured to receive a measurement signal from the microphone and to determine the value indicative of a presence or a concentration of the component dependent on the measurement signal, preferably including signal processing such as linearization and/or compensation. In particular the value is determined dependent on an amplitude of the measurement signal, e.g. a loudness in the case of a sound wave. Preferably the measurement signal is bandpass-filtered around the modulation frequency. This increases a robustness of the determination since sound waves with other frequencies are not taken into account.

In an embodiment, the opening between the measurement volume and the bottom port of the microphone has a dimension perpendicular to the first side of the substrate of more than 10 μm, preferably more than 50 μm, preferably between 10 μm and 100 μm, preferably between 50 μm and 100 μm. Preferably, such opening between the measurement volume and the bottom port of the microphone is laterally defined by a solder or a spacer between the microphone and the substrate. Accordingly the opening may result from mounting the microphone on the substrate, e.g. by soldering in the form of a half circle, while leaving a side of the otherwise complete microphone port soldering ring unsoldered, which then defines the opening. The unsoldered side may be achieved by applying a suitable structure of solder stop varnish and metal contacts on the bottom side of the microphone and the first side of the substrate. In this way, the opening has a typical lateral dimension in the order of 1×2 mm², and the perpendicular dimension, i.e. a height, as required above. In a different embodiment, the opening may also be a lateral opening in a casing of the microphone.

Such lateral opening has several advantages. Firstly, it may prevent electromagnetic radiation from the electromagnetic radiation source from directly entering the opening due to its location, such that a photoacoustic effect, and hence a sound generation, in a material of the microphone is reduced. Secondly, such opening may act as an acoustic lowpass filter. High frequencies, which might deteriorate the measurement signal, are preferably damped, while low frequencies in the range of the modulation frequency, e.g. between 10 Hz and 200 Hz, are not damped. Thirdly, as mentioned above, a top surface, and preferably other surfaces, of the microphone facing the measurement volume may be coated with reflective coating, or may include reflective material present anyway which can beneficially be used.

In an embodiment, the device further comprises a second sensor for sensing one or more of temperature and/or humidity and/or pressure and/or different components in the gas. Accordingly, the second sensor may be embodied as one or more of a pressure sensor, a barometric pressure sensor, another microphone, another gas sensor, e.g. of metal oxide type or of electrochemical type. The second sensor may be arranged on or integrated in the substrate. Preferably, the second sensor is located inside the measurement cell. In the presence of a second sensor, the controller is preferably configured to compensate the value indicative of a presence or a concentration of the component dependent on measurement values of the second sensor. Hence effects of ambient conditions on the measurement of the component can be reduced or eliminated. Such compensation makes a resulting concentration value more accurate and reliable, or in other words, the gas sensor device may be applied in varying environment conditions.

Other advantageous embodiments of photodetector are listed in the dependent claims as well as in the description below.

BRIEF DESCRIPTION OF THE DRAWINGS

Embodiments of the present invention, aspects and advantages will become apparent from the following detailed description thereof. The detailed description makes reference to the annexed drawings, wherein the figures show.

DETAILED DESCRIPTION OF THE DRAWINGS

Figure 1:
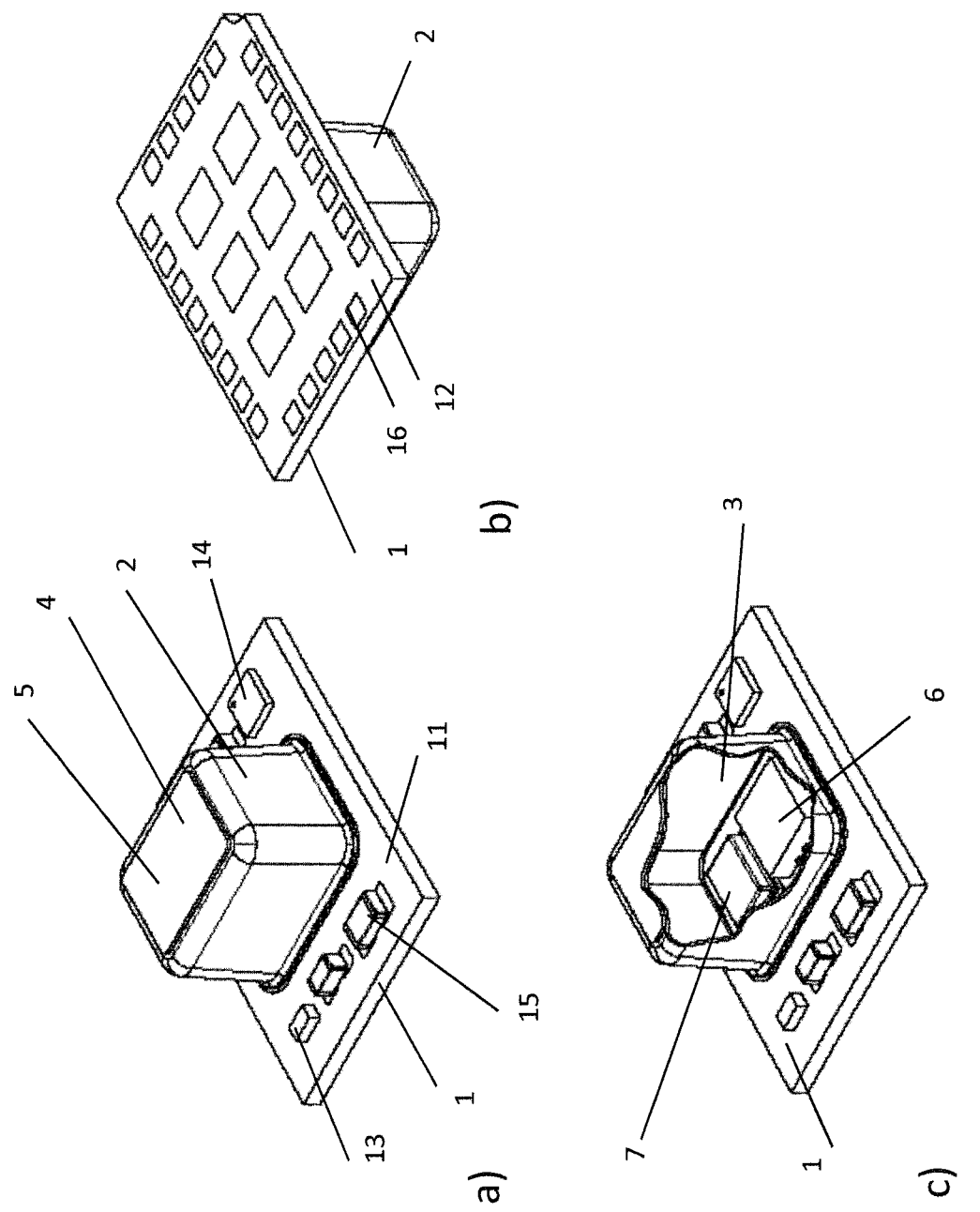
FIG. 1 perspective views a) and b) from top and from below, and an open cut view c) of a photoacoustic gas sensor device according to an embodiment of the invention, and FIGS. 2 and 3 schematic cut views of a photoacoustic gas sensor device according to embodiments of the invention.

Same elements are referred to by same reference numerals across all figures.

FIG. 1 shows perspective views of a photoacoustic gas sensor device according to an embodiment of the invention from above and from below. The device comprises a substrate 1, e.g. a printed circuit board (PCB), and a measurement cell body 2, which together form a measurement cell enclosing a measurement volume 3. The measurement cell has an aperture 4 to allow an exchange of gas between the measurement volume 3 and surroundings of the device. In FIG. 1, the aperture 4 is located in the measurement cell body 2. The aperture 4 is preferably covered by a membrane 5 which is gas permeable to allow for a gas exchange such that a concentration of the component of interest in the gas is similar as in the surroundings.

The substrate 1 has a first side 11 and a second side 12. On the first side 11, the measurement cell body 2 is arranged, as well as further parts described below. On the second side 12, land grid array (LGA) pads 16 are arranged for SMD assembly and reflow soldering by a customer. Other contacts such as DFN, QFN or castellated holes are possible.

The further parts arranged on the first side 11 of the substrate 1 comprise a microphone 6 and an electromagnetic radiation source, which in this example is an infrared source 7, which are both located inside the measurement cell. The microphone 6 may be a MEMS microphone or any pressure transducer. A sensitivity of the pressure transducer is not necessarily limited to an acoustic frequency band but may be configured to measure frequencies up to 100 kHz. The infrared source 7 may be an infrared emitter with an optical bandpass filter. More details and alternatives for the microphone 6 and the infrared source 7 are described later in the context of FIGS. 2 and 3.

The further components may also comprise a second sensor 13 arranged on the first side 11 of the substrate 1. In FIG. 1, the second sensor 13 is located outside the measurement cell; in a different embodiment, however, it may as well be located inside the measurement cell. Such second sensor 13 advantageously is one or more of the following: a temperature sensor, a humidity sensor, a combined temperature/humidity sensor, a pressure sensor, in particular a barometric pressure sensor, another microphone, another gas sensor, e.g. of metal oxide type or of electrochemical type. Through measurement values of temperature and/or humidity, a gas concentration value may be compensated, e.g. for effects of temperature and/or humidity. In the presence of a second sensor, a controller 14 preferably is configured to compensate the value indicative of a presence or a concentration of the component for the impact of the variable measured by the second sensor and hence, dependent on measurement values of the second sensor. Hence effects of ambient conditions on the measurement of the component can be reduced or eliminated.

The controller 14 may e.g. be an ASIC. The controller 14 is preferably located outside the measurement cell. The controller 14 is configured for controlling the infrared source 7, e.g. by imposing an intensity modulation on the infrared radiation with a modulation frequency. The modulation frequency may be within the audible spectrum, e.g. between 20 Hz and 20 kHz, or it may be up to 100 kHz, or it may even be down to 5 Hz. The controller 14 is further configured for receiving measurement values from the microphone 6, as well as for determining a value of the gas component concentration from those measurement values, e.g. by using a predefined or a resettable calibration function linking the measurement values to concentration value of the gas component. The value of the gas component concentration may be output via a digital interface, e.g. an I2C interface. When determining the value of the gas component concentration, the controller 14 may also take into account measurement values of the second sensor 13, if available, e.g. temperature and/or humidity values, and perform a compensation as described above. For $CO_2$ as the relevant gas component, measurements in the range between 0 and 10'000 ppm, or between 0 and 40'000 ppm, or between 0 and 60'000 ppm $CO_2$ are possible.

Further components arranged on the first side 11 of the substrate 1, preferably outside the measurement cell, may be passive components or auxiliary electronics 15, e.g. capacitors and resistors, as required.

The proposed photoacoustic gas sensor device, as e.g. shown in FIG. 1, may be built with a small form factor, such that it has an overall size of e.g. 1×1×0.7 cm³. Thus it is significantly smaller and also cheaper to manufacture than conventional photoacoustic or NDIR-based gas sensors.

Figure 2:
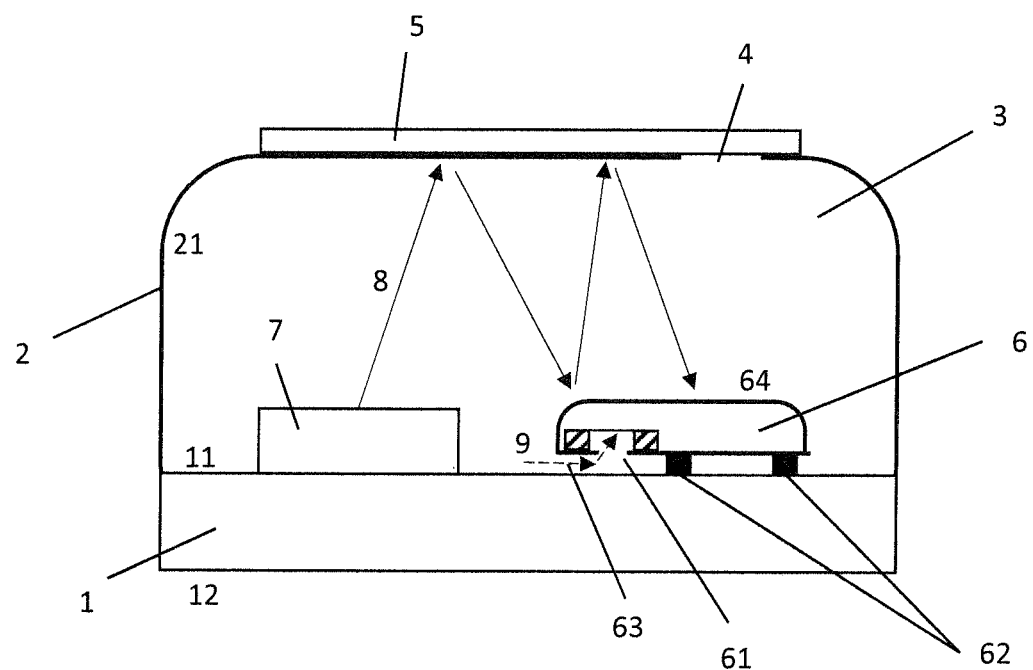
Figure 3:
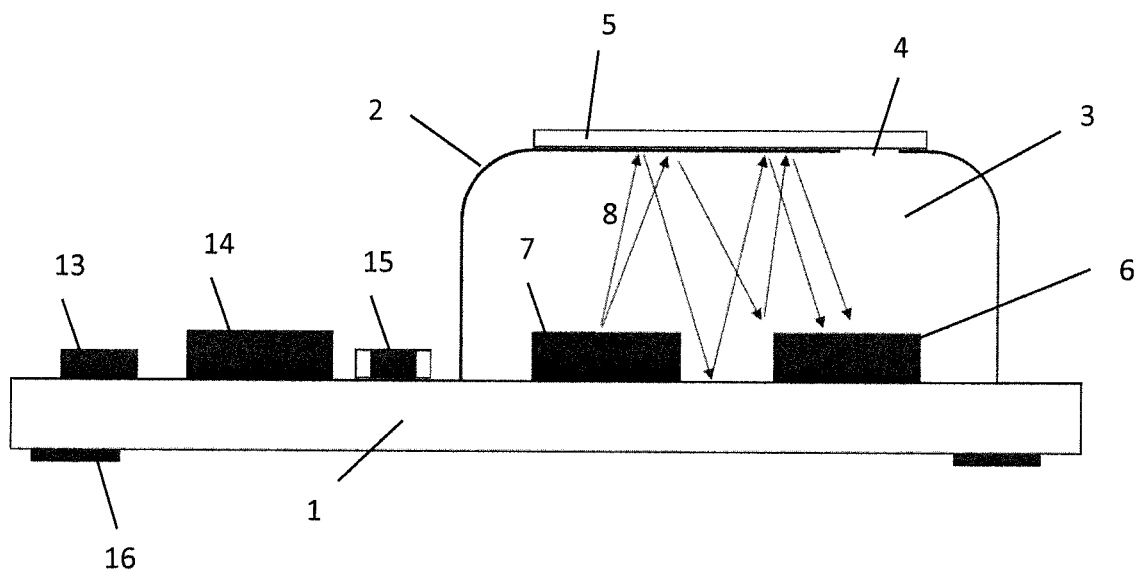

FIGS. 2 and 3 show schematic cut views of a photoacoustic gas sensor device according to embodiments of the invention. FIG. 2 gives a detailed view of the measurement cell only, whereas FIG. 3 displays the entire device including components outside the measurement cell as described above.

The infrared source 7 may be a broadband infrared emitter, e.g. emitting radiation over the entire infrared spectrum, covered with an optical bandpass filter. The optical bandpass filter lets only pass radiation of a band that is set according to the gas component of interest. For a detection of $CO_2$, the band is for instance centered around 4.3 μm, and has a typical band width of 0.5 μm, or smaller, e.g. 0.2 μm or 0.1 μm, such that a measured value is actually selective on $CO_2$.

The infrared source 7 emits infrared radiation 8 of the band, wherein the intensity of the infrared radiation 8 is modulated as described above. The infrared radiation 8 is selectively absorbed by molecules of the gas component of interest. A ratio of radiation 8 absorbed may be increased by increasing a mean optical path length of the radiation 8 within the measurement volume 3. This is achieved by one or more of the following options. A material of the measurement cell body 2 is chosen to be reflective, such as a sheet metal. Alternatively, or additionally, an inner surface of the measurement cell is coated with a reflective coating 21. Such reflective coating may be made from a metal such as gold, aluminum, nickel, copper. The reflective coating 21 may not only be arranged on an inner surface of the measurement cell body 2, but also on one or more of the following: parts of the first side 11 of the substrate 1, on parts of the microphone 6, such as its top side 64 (see FIG. 2), on parts of the infrared source 7. In this way, the overall reflectivity inside the measurement cell is increased, which leads to more accurate measurements of the concentration of the component. The increase of the mean optical path length, in particular in contrast to the linear optical path in conventional photoacoustic gas sensors, is illustrated by multiple reflections of the infrared radiation 8 in FIGS. 2 and 3.

The microphone 6 in FIGS. 2 and 3 is a bottom port microphone, arranged with its bottom port 61 facing the substrate 1 and mounted via solder joints 62. FIG. 2 additionally indicates the pressure variations, i.e. the sound 9, entering the microphone 6 via an acoustic opening 63 and the bottom port 61. The acoustic opening 63 is located between the substrate 1 and the microphone 6, with a height of the opening being defined by a thickness of the solder joints 62, e.g. in the range of 10 μm to 100 μm. Since the sound 9 enters the microphone 6 laterally via the opening 63, the top side 64 of the microphone 6 may be coated with reflective coating as discussed above. Also the opening 63 acts as a lowpass filter for the sound 9, filtering out high-frequency sounds which might deteriorate the measurement of the gas component's concentration, such as sounds originating from the surroundings of the device. Furthermore the bottom port microphone, due to its large backside volume 65 behind a membrane of the microphone, generally has a frequency response which is favorable for low frequency sounds.

While above there are shown and described embodiments of the invention, it is to be understood that the invention is not limited thereto but may be otherwise variously embodied and practiced within the scope of the following claims.

The invention claimed is:

1. A photoacoustic gas sensor device, for determining a value indicative of a presence or a concentration of a component in a gas, the photoacoustic gas sensor device comprising:
   a substrate,
   a measurement cell body arranged on a first side of the substrate,
   the substrate and the measurement cell body defining a measurement cell enclosing a measurement volume,
   the measurement cell comprising an aperture for a gas to enter the measurement volume,
   an electromagnetic radiation source for emitting electromagnetic radiation,
   a microphone for measuring a sound wave generated by the component in response to an absorption of electromagnetic radiation by the component, wherein the electromagnetic radiation source and the microphone are arranged on the first side of the substrate and in the measurement volume, wherein the microphone has a bottom port facing the substrate, and wherein the measurement volume is communicatively coupled to the bottom port.

2. The photoacoustic gas sensor device according to claim 1, wherein dimensions of the measurement cell are smaller than 2×2×2 cm$^3$.

3. The photoacoustic gas sensor device according to claim 1, wherein an inner surface of the measurement cell has a reflectivity of more than 70%.

4. The photoacoustic gas sensor device according to claim 1, wherein an inner surface of the measurement cell body and/or a part of the substrate is coated with a reflective coating having a reflectivity of more than 70%.

5. The photoacoustic gas sensor device according to claim 1, wherein a ratio of inner surfaces of the measurement cell with a reflectivity of above 70% to inner surfaces of the measurement cell with a reflectivity of below 70% is above 20.

6. The photoacoustic gas sensor device according to claim 4, wherein a top side of the microphone facing the measurement volume is made of a reflective material or is coated with the reflective coating.

7. The photoacoustic gas sensor device according to claim 1, wherein an opening between the measurement volume and the bottom port of the microphone has a dimension perpendicular to the first side of the substrate of more than 10 μm.

8. The photoacoustic gas sensor device according to claim 1, wherein an opening between the measurement volume and the bottom port of the microphone is laterally defined by a solder or a spacer between the microphone and the substrate.

9. The photoacoustic gas sensor device according to claim 1, further comprising a controller configured to control the electromagnetic radiation source, wherein the controller is configured to control an intensity of the electromagnetic radiation to modulate with a modulation frequency, wherein the modulation frequency is between 1 Hz and 100 kHz.

10. The photoacoustic gas sensor device according to claim 9, wherein the controller is configured to receive a measurement signal from the microphone and to determine the value indicative of a presence or a concentration of the component dependent on the measurement signal.

11. The photoacoustic gas sensor device according to claim 1, further comprising a gas permeable membrane covering the aperture, wherein the membrane is permeable for a gas exchange between the measurement volume and surroundings of the measurement cell, wherein the gas permeable membrane is made of one or more of the following materials: sintered metal, ceramic, plastic.

12. The photoacoustic gas sensor device according to claim 9, wherein the electromagnetic radiation source is an infrared source, wherein the infrared source is one of the following:

a broadband source covered by a wavelength-selective bandpass filter filtering out infrared radiation outside the band, a narrowband source comprising a meta-surface resonator, and wherein a heater of the infrared source is switched with the modulation frequency.

13. The photoacoustic gas sensor device according to claim 1, further comprising a second sensor for sensing one or more of temperature, humidity, pressure, one or more different components in a gas, arranged on or integrated in the substrate, and located inside the measurement cell.

14. The photoacoustic gas sensor device according to claim 9, further comprising a second sensor for sensing one or more of temperature, humidity, pressure, one or more different components in a gas, arranged on or integrated in the substrate, wherein the controller is configured to compensate the value indicative of a presence or a concentration of the component dependent on measurement values of the second sensor.

15. The photoacoustic gas sensor device according to claim 1, wherein the electromagnetic radiation source and the microphone are arranged on the first side of the substrate by surface mounting.

16. The photoacoustic gas sensor device according to claim 1 for use as a CO2 sensor, wherein the electromagnetic radiation source is an infrared source, wherein the band of infrared radiation is centered around a wavelength of 4.3 μm.

17. The photoacoustic gas sensor device according to claim 4, wherein the reflective coating is made from a metal.

18. The photoacoustic gas sensor device according to claim 10, wherein the controller is configured to determine the value indicative of a presence or a concentration of the component dependent on an amplitude of the measurement signal.

19. The photoacoustic gas sensor according to claim 15, wherein all electronic components are arranged on the first side of the substrate by surface mounting while a second side of the substrate opposite the first side only includes contacts for electrically connecting to the photoacoustic gas sensor device.

20. The photoacoustic gas sensor device according to claim 16, wherein the band has a full width at half maximum of below 0.5 μm.

* * * * *